United States Patent
Leenders et al.

(10) Patent No.: US 7,380,500 B2
(45) Date of Patent: Jun. 3, 2008

(54) PROCESS FOR THE OFFSET PRINTING OF PATTERNS VIA THE FOUNTAIN MEDIUM

(75) Inventors: Luc Leenders, Mortsel (BE); Eddie Daems, Mortsel (BE)

(73) Assignee: Agfa-Gevaert, Mortsel (BE)

( * ) Notice: Subject to any disclaimer, the term of this patent is extended or adjusted under 35 U.S.C. 154(b) by 48 days.

(21) Appl. No.: 10/693,730

(22) Filed: Oct. 24, 2003

(65) Prior Publication Data

US 2004/0083913 A1 May 6, 2004

Related U.S. Application Data

(60) Provisional application No. 60/427,162, filed on Nov. 18, 2002.

(30) Foreign Application Priority Data

Oct. 31, 2002 (EP) .................. 02102518

(51) Int. Cl.
C09D 5/02 (2006.01)
(52) U.S. Cl. .................. 101/451; 101/147; 101/217; 106/2
(58) Field of Classification Search ............. 101/465, 101/466, 467, 147, 217, 451; 430/302, 270.1; 106/2
See application file for complete search history.

(56) References Cited

U.S. PATENT DOCUMENTS

| | | | |
|---|---|---|---|
| 3,476,937 A | 11/1969 | Vrancken et al. | |
| 4,081,572 A | 3/1978 | Pacansky | |
| 4,145,264 A * | 3/1979 | Thoma et al. | 205/424 |
| 5,098,534 A * | 3/1992 | Nakamura et al. | 205/718 |
| 5,163,999 A * | 11/1992 | Uchida et al. | 106/2 |
| 5,296,336 A * | 3/1994 | Doi et al. | 430/331 |
| 5,569,573 A | 10/1996 | Takahashi et al. | |
| 5,658,713 A * | 8/1997 | Van Hunsel et al. | 430/331 |
| 5,826,507 A * | 10/1998 | Lim | 101/350.1 |
| 6,096,485 A | 8/2000 | Kasai et al. | |
| 6,165,691 A * | 12/2000 | Damme et al. | 430/303 |
| 6,248,503 B1 * | 6/2001 | Vermeersch et al. | 430/302 |
| 6,312,873 B1 * | 11/2001 | Matsumoto et al. | 430/309 |
| 6,632,472 B2 * | 10/2003 | Louwet et al. | 427/126.1 |
| 6,820,552 B2 * | 11/2004 | Verschueren et al. | 101/467 |
| 6,827,435 B2 * | 12/2004 | Domoto et al. | 347/102 |
| 2002/0077450 A1 * | 6/2002 | Kirchmeyer et al. | 528/373 |
| 2002/0083858 A1 * | 7/2002 | MacDiarmid et al. | 101/484 |
| 2005/0053867 A1 * | 3/2005 | Delabastita et al. | 430/302 |
| 2005/0160780 A1 * | 7/2005 | Kimura et al. | 72/53 |

FOREIGN PATENT DOCUMENTS

| | | |
|---|---|---|
| EP | 0 200 488 A2 | 12/1986 |
| EP | 0 652 483 B1 | 5/1998 |
| EP | 0 646 476 B1 | 6/1998 |
| EP | 0 949 088 A1 | 10/1999 |
| EP | 0 882 583 B1 | 6/2002 |
| EP | 0 924 065 B1 | 5/2003 |
| EP | 0 924 102 B1 | 7/2003 |
| GB | 2254917 * | 10/1992 |
| WO | WO 92/09934 A1 | 6/1992 |
| WO | WO 01/88958 A2 | 11/2001 |

OTHER PUBLICATIONS

"Chemistry of the Group 1 Elements", http://www.bbc.co.uk/dna/h2g2/A1002709, Mar. 19, 2003, pp. 1-6.*
Hohnholz et al., *Synthetic Metals*, 121, 1327-1328 (2001).
Search Report for EP 02 10 2518 (Mar. 17, 2003).

* cited by examiner

*Primary Examiner*—Daniel J. Colilla
*Assistant Examiner*—Kevin D Williams
(74) *Attorney, Agent, or Firm*—Leydig Voit & Mayer, Ltd.

(57) ABSTRACT

A process for the offset printing of a receiving medium with a functional pattern comprising in any order the steps of: applying a printing ink to a printing plate and wetting the printing plate with an aqueous fountain medium containing a solution or a dispersion containing at least one moiety having at least colouring, pH-indicating, whitening, fluorescent, phosphorescent, X-ray phosphor or conductive properties.

88 Claims, No Drawings

PROCESS FOR THE OFFSET PRINTING OF PATTERNS VIA THE FOUNTAIN MEDIUM

CROSS-REFERENCE TO RELATED PATENT APPLICATIONS

This application claims the benefit of U.S. Provisional Application Ser. No. 60/427,162 filed Nov. 18, 2002, which is incorporated by reference. In addition, this application claims the benefit of European Application No. 02102518.4 filed Oct. 31, 2002, which is also incorporated by reference.

FIELD OF THE INVENTION

The present invention relates to a process for the offset printing of patterns via the fountain medium.

BACKGROUND OF THE INVENTION

Lithographic printing presses use a so-called printing master such as a printing plate which is mounted on a cylinder of the printing press. The master carries a lithographic image on its surface and a print is obtained by applying ink to the image and then transferring the ink from the master onto a receiver material, which is typically paper. In conventional lithographic (offset) printing, both ink and an aqueous fountain solution (also called dampening liquid) are supplied to the lithographic image which consists of oleophilic (or hydrophobic, i.e. ink-accepting, water-repelling) areas as well as hydrophilic (or oleophobic, i.e. water-accepting, ink-repelling) areas. In so-called driographic printing, the lithographic image consists of ink-accepting and ink-abhesive (ink-repelling) areas and during driographic printing, only ink is supplied to the master.

Plate materials include those based on UV-exposure through a mask or image-wise exposure with a laser followed by processing with solubilization in the case of positive plates or insolubilization in the case of negative plates, and those for processing using laser-ablation techniques, such as used in typical computer-to-plate plates or plate materials which are not ablative and do not need wet processing. Known examples of such non-ablative processless plate materials contain a so-called 'switchable' image-recording layer, i.e. a layer of which the affinity towards ink or an ink-abhesive fluid can be converted upon image-wise exposure from one state to the opposite state, e.g. from hydrophilic to oleophilic or from ink-accepting to ink-abhesive. Such materials are based on
- switchable polymers (e.g. EP 924 102) which can be image-wise converted from a hydrophobic state to a hydrophilic state (WO92/09934; EP 652 483) or vice-versa (U.S. Pat. No. 4,081,572; EP 200 488; EP 924 065);
- thermally induced coalescence of thermoplastic polymer particles in a crosslinked binder (U.S. Pat. No. 3,476,937; EP-A 882 583; Research Disclosure no. 33303); and
- thermally induced rupture of microcapsules and the subsequent reaction of the microencapsulated oleophilic compounds with functional groups on cross-linked hydrophilic binders (U.S. Pat. No. 5,569,573; EP 646 476; EP 949 088).

In offset printing a fountain solution and then the ink are applied to the printing plate on a drum and they are transferred to an intermediate (rubber) roll, known as the offset blanket, from which they are printed onto paper sheets transported between the impression cylinder and the intermediate (rubber) roll.

The fountain solution is transferred via a series of rolls to the printing plate or a fine emulsion of ink and the fountain solution are prepared on an ink roll which is then applied to the plate. The fountain solution conventionally acts as a weak sacrificial layer and prevents ink from depositing on the non-image area of the plate and has the function of rebuilding the non-printing (desensitized) areas of the printing plate during a press run. This is usually realized with acid, usually phosphoric acid, and gum arabic, the acid and gum combining to form a molecule that helps the adsorption of the gum to the metal of the plate and thereby making a hydrophilic surface. Fountain solutions have historically contained isopropyl alcohol to reduce the surface tension and thereby to provide for more uniform dampening of the printing plate, but, by eliminating (or greatly reducing) the isopropyl alcohol as a fountain solution additive, printers are able to reduce VOC (volatile organic compound) emissions significantly. In such fountain solutions isopropyl alcohol is replaced with lower volatility glycols, glycol ethers, or surfactant formulations. Conventional fountain solutions may also contain anti-corrosion agents, pH-regulators and surfactants.

WO 01/88958 discloses in claim 1 a method of forming a pattern of a functional material on a substrate comprising: applying a first pattern of a first material to said substrate; and applying a second functional material to said substrate and said first material, wherein said first material, said second functional material, and said substrate interact to spontaneously form a second pattern of said second functional material on said substrate, to thereby form a pattern of a functional material on a substrate.

WO 01/88958 further discloses in claim 27 a method of forming a pattern of a functional material on a substrate comprising: non-contact printing a first pattern of a first material on said substrate; and applying a second functional material to said substrate and said first material, wherein said first material, said second material, and said substrate interact to spontaneously form a second pattern of said second functional material on said substrate, to thereby form a pattern of a functional material on a substrate.

WO 01/88958 also discloses in claim 47 a method of forming a pattern of a functional material on a substrate comprising: non-contact printing a first pattern of a first material on said substrate; and applying a second functional material to said substrate and said first material, wherein said first and second functional materials are selected to have a sufficient difference in at least one property of hydrophobicity and hydrophilicity relative to one another such that said first material, said second functional material, and said substrate interact to spontaneously form a second pattern of said second functional material on said substrate, to thereby form on said substrate a second pattern of said second functional material, wherein said second pattern is the inverse of said first pattern, to thereby form a pattern of a functional material on a substrate.

WO 01/88958 also discloses in claim 57 a method of forming an electrical circuit element, comprising: applying a first pattern of a first material on a substrate; and applying a second material to said substrate and said first material, wherein said first material, said second material, and said substrate interact to spontaneously form a second pattern of said second material on said substrate, thereby forming an electrical circuit element.

WO 01/88958 also discloses in claim 110 an electrical circuit element comprising: a substrate; a first pattern of an insulating material applied to said substrate; and a second pattern of an electrically conducting material applied to said substrate and said first material, wherein said insulating material, said electrically conducting material, and said substrate interact to spontaneously form a second pattern of said electrically conducting material on said substrate when said electrically conducting material is applied to said substrate having said first pattern of said insulating material applied thereon.

WO 01/88958 also discloses in claim 123 an electronic device comprising: a) a first element comprising i) a first substrate; ii) a first pattern of an insulating material applied to said substrate and iii) a second pattern of an electrically conducting material applied to said substrate and said first material, wherein said insulating material, electrically conducting material, and said substrate interact to spontaneously form a second pattern of said electrically conducting material on said substrate when said electrically conducting material is applied to said substrate having said first pattern of said insulating material applied thereon; b) a second circuit element comprising i) a second substrate; ii) a third pattern of an insulating material applied to said second substrate and iii) a fourth pattern of an electrically conducting material applied to said second substrate and said third material, wherein said insulating, electrically conducting material, and said second substrate interact to spontaneously form a fourth pattern of said electrically conducting material on said substrate when said electrically conducting material is applied to said substrate having said third pattern of said insulating material applied thereon; and c) an electrically connection between said first and second circuit elements.

WO 01/88958 also discloses in claim 127 a Radio Frequency (RF) tag comprising a pattern of a non-conductive first material on a substrate and a coating of an electrically conductive second material disposed over said substrate and said first material, wherein said first material, said second material, and said substrate interact to spontaneously form a second pattern of said second material on said substrate, to thereby form an Inductor-Capacitor (LC) resonator on said substrate.

WO 01/88958 also discloses in claim 141 a mechanical device comprising: a) a first component comprising: i) a first substrate; ii) a first pattern of first material to said first substrate and iii) a second pattern of material applied to said first substrate and said first material, wherein said second pattern of said second material is spontaneously formed by the interaction of said first material, said second material and said first substrate; and b) a second component comprising i) a second substrate; ii) a third pattern of a third material applied to said second substrate and iii) a fourth pattern of a fourth material applied to said second substrate and said third material, wherein said fourth pattern of said fourth material is spontaneously formed by the interaction of said third material, said fourth material and said substrate; and wherein said first and second components are oriented in a such a way that the second and fourth patterns oppose each other, and are selected from the group consisting of identical patterns, inverse patterns, and any mechanically useful combinations.

In 2001, Hohnholz et al. in Synthetic Metals, volume 121, pages 1327-1328, reported a novel method for the preparation of patterns from conducting and non-conducting polymers on plastic/paper substrates. This method, "Line Patterning" (LP), does not involve printing of the polymers and incorporates mostly standard office equipment, e.g. an office type laser printer. It is rapid and inexpensive. The production of electronic components, e.g. a liquid crystal and a push-button assembly were reported.

It has been found that aqueous solutions and dispersions of intrinsically conductive polymers upon coating upon a surface with hydrophobic and hydrophilic areas eventually exclusively permeate to the hydrophilic areas, but at a speed which makes such processes industrially impracticable. There is a need for a mass-production process for producing conductive patterns of intrinsically conductive polymer. There is also a need for a mass-production process for other functional patterns such as fluorescent, phosphorescent, X-ray phosphor and pH-indicator patterns.

ASPECTS OF THE INVENTION

It is therefore an aspect of the present invention to provide a process for producing functional patterns containing at least one moiety having at least colouring, pH-indicating, whitening, fluorescent, phosphorescent, X-ray phosphor or conductive properties.

It is therefore a further aspect of the present invention to provide a process for producing conductive patterns of intrinsically conductive polymers.

Further aspects and advantages of the invention will become apparent from the description hereinafter.

SUMMARY OF THE INVENTION

Surprisingly it has been found that if, in a conventional offset printing process using standard offset ink, the standard fountain is substituted by a fountain solution or dispersion containing at least one moiety having at least colouring, pH-indicating, whitening, fluorescent, phosphorescent, X-ray phosphor or conductive properties, the conventional wetting and repairing function of a fountain can be augmented by coating the hydrophilic areas of the printing plate with at least one having at least colouring, whitening, fluorescent, phosphorescent, X-ray phosphor or conductive properties. Examples of such moieties are inorganic moieties such as: titanium dioxide pigments and calcium wolframate pigments, and organic moieties such as: the conductive polymers polyaniline and poly(3,4-ethylenedioxythiophene)[PEDOT]/poly(styrene-sulfonate), the fluorescent whitening agents Tinopal™ SHP liquid from Ciba-Geigy and Leucopur™ PAM from Clariant, the fluorescent compound fluorescein.

For example if, in a conventional offset printing process using standard offset ink, the standard fountain is substituted by a fountain dispersion containing 3% by weight of poly (3,4-ethylenedioxythiophene)[PEDOT]/poly(styrene-sulfonate)[PSS], prints are immediately obtained with a conductive pattern in the non-inked areas corresponding to the hydrophilic areas of the offset printing plate used, which pattern is maintained in an extended printing run i.e. a stable situation is realized upon the offset printing plate with the hydrophobic areas being inked with the hydrophobic printing ink and the hydrophilic areas being wetted with the modified fountain solution. On the other hand, if no printing ink is used some surface resistance differentiation is observed in the first few prints corresponding to the hydrophilic pattern on the offset printing plate, but degree of surface resistance differentiation decreased with successive prints and had completely disappeared by the fifteenth print.

Aspects of the present invention have been realized by a process for the offset printing of a functional pattern comprising in any order the steps of: applying a printing ink to a printing plate and wetting the printing plate with an aqueous fountain medium containing a solution or a dispersion containing at least one moiety having at least colouring, pH-indicating, whitening, fluorescent, phosphorescent, X-ray phosphor or conductive properties.

Preferred embodiments are disclosed in the dependent claims.

DETAILED DESCRIPTION OF THE INVENTION

Definitions

The term alkoxy means all variants possible for each number of carbon atoms in the alkoxy group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term oxyalkylenealkoxy means two oxygen atoms linked by an alkylene group. An alkylene group is a substituted or unsubstituted hydrocarbon group e.g. a $-(CH_2)_n-$ group where n is an integer between 1 and 5, which may be substituted with an alkoxy, aryloxy, alkyl, aryl, alkaryl, alkyloxyalkyl, alkyloxyalkaryl, alkyloxyaryl, hydroxy, carboxy, carboxyalkyl, carboxyamino, sulfo or alkylsulfo group.

The term derivatives as used in connection with a particular polymer refers to variants thereof substituted with alkyl, alkoxy, alkyloxyalkyl, carboxy, alkylsulfonato and carboxy ester groups.

The term transparent layer as used in disclosing the present invention means permitting the passage of light in such a way that objects can be clearly seen through the layer.

The term aqueous medium means a medium containing water and water-miscible organic solvents containing between 50% by weight of water and 100% by weight of water.

The term layer according to the present invention means a continuous or discontinuous coating.

The term pattern according to the present invention means a discontinuous coating.

The term flexible as used in disclosing the present invention means capable of following the curvature of a curved object such as a drum e.g. without being damaged.

The term printing ink, according to the present invention, means an ink, which may or may not be pigmented with at least one dye or pigment and which is suitable for offset printing i.e. accepted by the oleophilic areas of a printing master plate, commonly known as a printing plate.

The term dye, according to the present invention, means a coloring agent having a solubility of 10 mg/L or more in the medium in which it is applied and under the ambient conditions pertaining.

The term pigment is defined in DIN 55943, herein incorporated by reference, as an inorganic or organic, chromatic or achromatic coloring agent that is practically insoluble in the application medium under the pertaining ambient conditions, hence having a solubility of less than 10 mg/L therein.

The term coated paper as used in disclosing the present invention is paper coated with any substance i.e. includes both clay-coated paper and resin-coated paper.

Freeze drying according to the present invention is a lyophilization process in which a substance is first frozen and then the quantity of solvent (generally water) is reduced, first by sublimation (=primary drying process) and then by desorption (=secondary drying process) until the temperature of the shelves becomes equal to the atmospheric temperature in the freeze dryer. The freeze-drying process is enabled by the ability of solid materials such as ice to sublime (change directly into a gas without passing through a liquid phase) under the right conditions.

The term "dry product" according to the present invention means dry to touch and is associated with no apparent liquid phase.

The term conductive means having a surface resistance or $10^{11}$ Ω/square or less and is a generic term including both the terms antistatic and electroconductive. The term electroconductive means having a surface resistance below $10^6$ Ω/square. Antistatic materials have surface resistances in the range from $10^6$ to $10^{11}$ Ω/square and cannot be used as an electrode.

The electric resistance of a layer is generally expressed in terms of surface resistance $R_s$ (unit Ω; often specified as Ω/square). Alternatively, it may be expressed in terms of volume resistivity $R_v=R_s \cdot d$, wherein d is the thickness of the layer, volume conductivity $k_v=1/R_v$ [unit: S(iemens)/cm] or surface conductance $k_s=1/R_s$ [unit: S(iemens).square].

Conductivity enhancement refers to a process in which contact with high boiling point liquids such as di- or polyhydroxy- and/or carboxy groups or amide or lactam group containing organic compound optionally followed by heating at elevated temperature, preferably between 100 and 250° C., during preferably 1 to 90 seconds, results in conductivity increase. Alternatively in the case of aprotic compounds with a dielectric constant $\geq 15$, e.g. N-methyl-pyrrolidinone, temperatures below 100° C. can be used. Such conductivity enhancement is observed with polythiophenes and can take place during the preparation of a layer or subsequently. Particularly preferred liquids for such treatment are N-methyl-pyrrolidinone and diethylene glycol such as disclosed in EP-A 686 662 and EP-A 1 003 179, herein incorporated by reference.

PEDOT as used in the present disclosure represents poly(3,4-ethylenedioxythiophene).

PSS as used in the present disclosure represents poly (styrene sulphonic acid) or poly(styrenesulphonate).

PET as used in the present disclosure represents poly (ethylene terephthalate).

The term improved in referring to aqueous dispersions of PEDOT/PSS refers to aqueous dispersions of PEDOT/PSS prepared according to the polymerization process disclosed in EP-A 0 440 957 except that the polymerization process is carried out in the substantial absence of oxygen.

Aqueous Fountain Medium

Aspects of the present invention have been realized by a process for the offset printing of a functional pattern comprising in any order the steps of: applying a printing ink to a printing plate and wetting the printing plate with an aqueous fountain medium containing a solution or a dispersion containing at least one moiety having at least colouring, pH-indicating, whitening, fluorescent, phosphorescent, X-ray phosphor or conductive properties. The moiety having at least colouring, pH-indicating, whitening, fluorescent, phosphorescent, X-ray phosphor or conductive properties may be an organic, an inorganic or an organometallic species.

According to a first embodiment of the process, according to the present invention, the moiety having at least colouring, whitening, fluorescent, phosphorescent, X-ray phosphor or conductive properties is an intrinsically conductive polymer. The intrinsically conductive polymer may be incorporated into the aqueous fountain medium as a conventional aqueous dispersion of an intrinsically conductive polymer, such as available using the process disclosed in EP-A 0 440 957, as a product obtained by simple evaporation thereof or as a freeze-dried dry-to-touch product obtained by freeze-drying thereof as disclosed in WO 02/00759. Alternatively improved aqueous dispersions of an intrinsically conductive polymers can be used, such as obtained by polymerizing intrinsically conductive polymers in the substantial absence of oxygen.

The fountain solutions may also contain: water-soluble gums, a pH buffer system, desensitizing salts, acids or their salts, wetting agents, solvents, non-piling or lubricating additives, emulsion control agents, viscosity builders, biocides and defoamers.

According to a second embodiment of the process, according to the present invention, the aqueous fountain medium further contains an anti-foaming agent. Suitable anti-foaming agents include the silicone antifoam agent X50860A from Shin-Etsu.

According to a third embodiment of the process, according to the present invention, the aqueous fountain medium has a viscosity at 25° C. after stirring to constant viscosity of at least 30 mPa.s as measured according to DIN 53211 i.e. until successive measurements according to DIN 53211 are reproducible.

According to a fourth embodiment of the process, according to the present invention, the aqueous fountain medium has a viscosity at 25° C. after stirring to constant viscosity of at least 100 mPa.s as measured according to DIN 53211 i.e. until successive measurements according to DIN 53211 are reproducible.

According to a fifth embodiment of the process, according to the present invention, the aqueous fountain medium has a viscosity at 25° C. after stirring to constant viscosity of at least 200 mPa.s as measured according to DIN 53211 i.e. until successive measurements according to DIN 53211 are reproducible.

According to a sixth embodiment of the process, according to the present invention, the aqueous fountain medium has a pH between 1.5 and 5.5.

According to a seventh embodiment of the process, according to the present invention, the aqueous fountain medium further contains a water-soluble gum, such as gum arabic, larch gum, CMC, PVP, and acrylics.

Intrinsically Conductive Polymer

According to an eighth embodiment of the process, according to the present invention, the moiety is selected from the group consisting of polyanilines, polyaniline derivatives, polypyrroles, polypyrrole derivatives, polythiophenes and polythiophene derivatives.

According to a ninth embodiment of the process, according to the present invention, the moiety is a polymer or copolymer of a 3,4-dialkoxythiophene in which the two alkoxy groups may be the same or different or together represent an oxy-alkylene-oxy bridge optionally substituted with one or more substituents selected from the group consisting of alkyl, alkoxy, alkyloxyalkyl, carboxy, alkylsulphonato and carboxy ester groups.

According to a tenth embodiment of the process, according to the present invention, the moiety is a polymer or copolymer of a 3,4-dialkoxythiophene in which the two alkoxy groups together represent an optionally substituted oxy-alkylene-oxy bridge which is a 1,2-ethylene group, an optionally alkyl-substituted methylene group, an optionally $C_{1-12}$-alkyl- or phenyl-substituted 1,2-ethylene group, a 1,3-propylene group or a 1,2-cyclohexylene group, the substituents for the oxy-alkylene-oxy bridge being selected from the group consisting of alkyl, alkoxy, alkyloxyalkyl, carboxy, alkylsulphonato and carboxy ester groups.

According to an eleventh embodiment of the process, according to the present invention, the moiety is a polymer or copolymer of a (3,4-dialkoxythiophene) has the formula

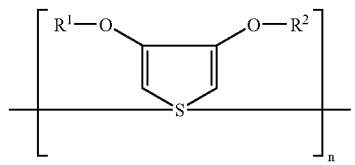

in which, each of $R^1$ and $R^2$ independently represents hydrogen or a $C_{1-5}$-alkyl group or together represent a $C_{1-5}$ alkylene group or a cycloalkylene group an optionally substituted with one or more substituents selected from the group consisting of alkyl, alkoxy, alkyloxyalkyl, carboxy, alkylsulphonato and carboxy ester groups.

According to a twelfth embodiment of the process, according to the present invention, the moiety is selected from the group consisting of: homopolymers of (3,4-methylenedioxy-thiophene), (3,4-methylenedioxythiophene) derivatives, (3,4-ethylenedioxythiophene), (3,4-ethylenedioxythiophene) derivatives, (3,4-propylenedioxythiophene), (3,4-(propylenedioxythiophene) derivatives, (3,4-butylenedioxythiophene) and (3,4-butylenedioxythiophene) derivatives and copolymers thereof.

Such polymers are disclosed in Handbook of Oligo- and Polythiophenes Edited by D. Fichou, Wiley-VCH, Weinheim (1999); by L. Groenendaal et al. in Advanced Materials, volume 12, pages 481-494 (2000); L. J. Kloeppner et al. in Polymer Preprints, volume 40(2), page 792 (1999); P. Schottland et al. in Synthetic Metals, volume 101, pages 7-8 (1999); and D. M. Welsh et al. in Polymer Preprints, volume 38(2), page 320 (1997).

Polyanion

According to a thirteenth embodiment of the process, according to the present invention, the aqueous fountain medium further contains a polyanion. Suitable polyanions include the polyanions of polymeric carboxylic acids, e.g. polyacrylic acids, polymethacrylic acids, or polymaleic acids, and polysulphonic acids, e.g. poly(styrene sulphonic acid). These polycarboxylic acids and polysulphonic acids can also be copolymers of vinylcarboxylic acids and vinylsulphonic acids with other polymerizable monomers, e.g. acrylic acid esters, methacrylic acid esters and styrene.

According to a fourteenth embodiment of the process, according to the present invention, the fountain medium further contains a poly(styrenesulfonate) polyanion or a polyanion of a copolymer of polystyrenesulphonic acid with styrene.

According to a fifteenth embodiment of the process, according to the present invention, the moiety is a polymer or copolymer of a 3,4-dialkoxythiophene, fountain medium further contains a polyanion and the molar ratio of the polymer or copolymer of a 3,4-dialkoxythiophene to polyanion is in the range of 1:0.95 to 1:6.5.

According to a sixteenth embodiment of the process, according to the present invention, the moiety is a polymer or copolymer of a 3,4-dialkoxythiophene, fountain medium further contains a polyanion and the molar ratio of the polymer or copolymer of a 3,4-dialkoxythiophene to polyanion is in the range of 1:0.95 to 1:3.0.

Water-Miscible Organic Compound

According to a seventeenth embodiment of the process, according to the present invention, the aqueous fountain medium further contains at least one water-miscible organic compound, such as aliphatic alcohols, ketones, arenes, esters, glycol ethers, cyclic ethers, such as tetrahydrofuran, and their mixtures.

According to an eighteenth embodiment of the process, according to the present invention, the aqueous fountain medium further contains at least one high boiling point liquid such as di- or polyhydroxy- and/or carboxy groups or amide or lactam group containing organic compounds capable of producing conductivity enhancement, e.g. by heating at elevated temperature, preferably between 100 and 250° C., during 1 to 90 seconds, such as diethylene glycol, 1,2-propandiol, glycerol, hexylene glycol, propylene glycol, di(ethylene glycol)ethyl ether acetate (carbitolo® acetate), N-methylacetamide, N-methyl pyrrolidinone (NMP) and sugar alcohols, such as sorbitol, mannitol, saccharose and fructose.

According to a nineteenth embodiment of the process, according to the present invention, the aqueous fountain medium further contains at least one aprotic compound with a dielectric constant $\geq 15$ capable of producing conductivity enhancement at temperatures below 100° C., such as N-methyl-pyrrolidinone(NMP), 2-pyrrolidinone, 1,3-dimethyl-2-imidazolidone, N,N,N',N'-tetramethylurea, formamide, N,N-dimethylformamide, N,N-dimethylacetamide, tetramethylene sulphone, dimethyl sulphoxide and hexamethylphosphoramide.

According to a twentieth embodiment of the process, according to the present invention, the aqueous fountain medium further contains at least one water-miscible organic compound selected from the group consisting of 1,2-propandiol, propylene glycol, diethylene glycol, N-methyl pyrrolidinone and di(ethylene glycol)ethyl ether acetate (carbitol® acetate).

The suitability of particular organic solvents can be evaluated by mixing 8 g of a 1.2% by weight aqueous dispersion of PEDOT/PSS with 12 g of solvent. If miscibility is observed without gel formation, the non-aqueous solvent is regarded as suitable. Tetrahydrofuran is miscible, but the dispersions are very viscous. Suitability according to the above miscibility test does not rule out phase separation upon further dilution of the PEDOT/PSS-dispersion with the same solvent, as is observed with tetrahydrofuran. It will be understood by one skilled in the art that a PEDOT/PSS-dispersion cannot be diluted to an unlimited extent without the possibility of phase separation. Ethyl lactate induces gel-formation and hence is unsuitable. Benzyl alcohol, furfuryl alcohol and cyclohexane produced phase separation and hence are unsuitable.

According to a twenty-first embodiment of the process, according to the present invention, the aqueous fountain medium further contains a di- or polyhydroxy- and/or carboxy groups or amide or lactam group containing organic compound and the process further contains a step subsequent to printing in which said receiving medium within 10 minutes of printing is heated to a temperature of 100 to 250° C.

According to a twenty-second embodiment of the process, according to the present invention, the aqueous fountain medium further contains an aprotic organic compound with a dielectric constant $\geq 15$ and the process further contains a step subsequent to printing in which the receiving medium within 10 minutes of printing is heated to a temperature of $\leq 150°$ C.

According to a twenty-third embodiment of the process, according to the present invention, the process further contains a obtaining a print by printing on a receiving medium, applying a liquid comprising a di- or polyhydroxy- and/or carboxy groups or amide or lactam group containing organic compound to the print, and heating the print after application of the liquid to a temperature of 100 to 250° C.

According to a twenty-fourth embodiment of the process, according to the present invention, the process further contains a obtaining a print by printing on a receiving medium, applying a liquid comprising an aprotic organic compound with a dielectric constant $\geq 15$ to the print, and heating the print after application of the liquid to a temperature of $\leq 150°$ C.

Pigments and Dyes

Aspects of the present invention have been realized by a process for the offset printing of a functional pattern comprising in any order the steps of: applying a printing ink to a printing plate and wetting the printing plate with an aqueous fountain medium containing a solution or a dispersion containing at least one moiety having at least colouring, pH-indicating, whitening, fluorescent, phosphorescent, X-ray phosphor or conductive properties.

The colouring moieties in the aqueous fountain medium used in the process, according to the present invention, may be pigments or dyes. Transparent coloured compositions can be realized by incorporating pigments e.g. azo pigments e.g. DALMAR® Azo Yellow and LEVANYL® Yellow HRLF, dioxazine pigments e.g. LEVANYL® Violet BNZ, phthalocyanine blue pigments, phthalocyanine green pigments, Molybdate Orange pigments, Chrome Yellow pigments, Quinacridone pigments, Barium precipitated Permanent Red 2B, manganese precipitated BON Red, Rhodamine B pigments and Rhodamine Y pigments.

According to a twenty-fifth embodiment of the process, according to the present invention, the colouring agent is a dye.

Suitable dyes include:
Acid Yellow = 23 (Tartraphenine) (from Claritant, Germany)
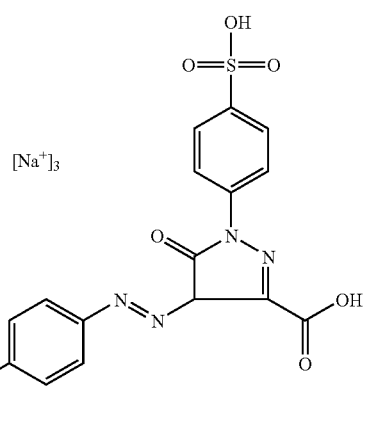
Direct Yellow 86 (from Farbenchem, Germany)
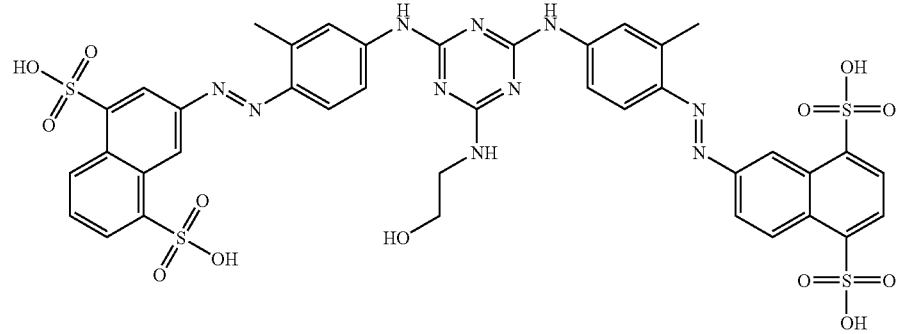
Reactive Red = 180 (from Aakash, USA)
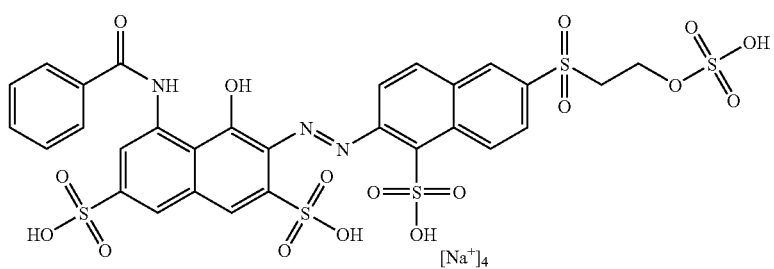
Direct Blue = 199 (from Farbenchem, Germany)
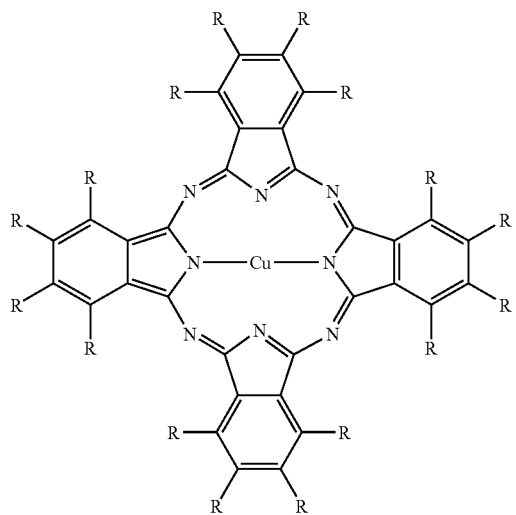
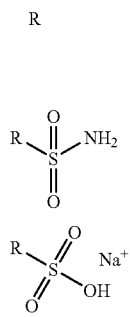

According to a twenty-sixth embodiment of the process, according to the present invention, the aqueous fountain medium contains a dye and/or a pigment such that the colour tone of the ink and the background cannot be distinguished by the human eye e.g. by colour matching or colour masking by for example matching the CIELAB a*, b* and L* values as defined in ASTM Norm E179-90 in a R(45/0) geometry with evaluation according to ASTM Norm E308-90.

According to a twenty-seventh embodiment of the process, according to the present invention, the printing ink contains a dye and/or a pigment such that the colour tone of the ink and the background cannot be distinguished by the human eye e.g. by colour matching or colour masking by for example matching the CIELAB a*, b* and L* values as defined in ASTM Norm E179-90 in a R(45/0) geometry with evaluation according to ASTM Norm E308-90.

pH-Indicating, Whitening, Fluorescent, Phosphorescent and X-Ray Phosphor Moieties Aspects of the present invention have been realized by a process for the offset printing of a functional pattern comprising in any order the steps of: applying a printing ink to a printing plate and wetting the printing plate with an aqueous fountain medium containing a solution or a dispersion containing at least one moiety having at least colouring, pH-indicating, whitening, fluorescent, phosphorescent, X-ray phosphor or conductive properties.

Suitable pH-indicating moieties for use in the aqueous fountain medium used in the process, according to the present invention, include: phenolphthalein, methyl red and methyl orange.

Suitable fluorescent moieties for use in the aqueous fountain medium, according to the present invention, include fluorescein:

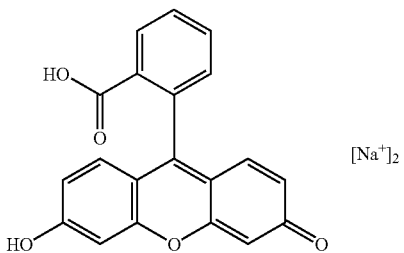

Suitable whitening moieties for use in the aqueous fountain medium, according to the present invention, include the fluorescent whitening agents:

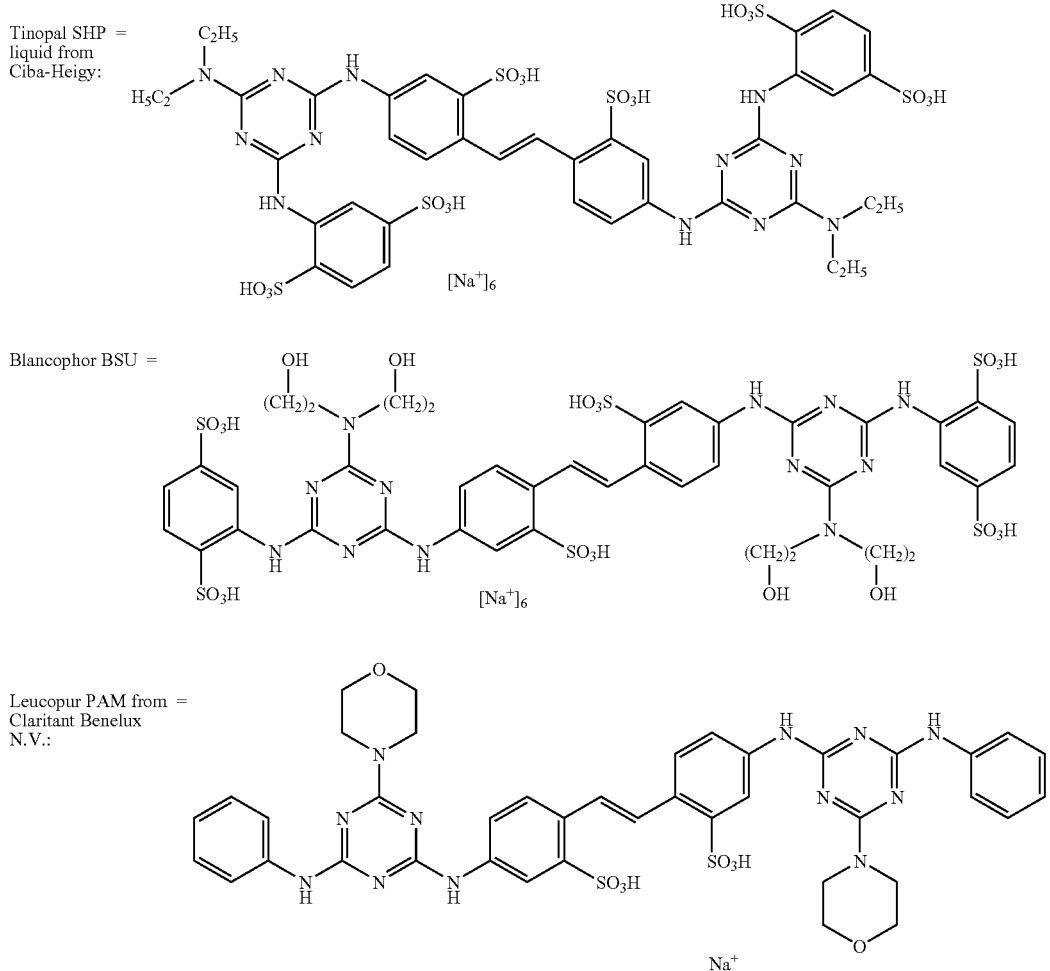

Suitable X-ray phosphor moieties for use in the aqueous fountain medium, according to the present invention, include calcium wolframate.

Surfactants

According to a twenty-eighth embodiment of the process, according to the present invention, the aqueous fountain medium further contains a surfactant.

According to a twenty-ninth embodiment of the process, according to the present invention, the aqueous fountain medium further contains a non-ionic surfactant e.g. ethoxylated/fluroralkyl surfactants, polyethoxylated silicone surfactants, polysiloxane/polyether surfactants, ammonium salts of perfluro-alkylcarboxylic acids, polyethoxylated surfactants and fluorine-containing surfactants.

Suitable non-ionic surfactants include:

| | | |
|---|---|---|
| NON01 | SURFYNOL ® 440: | an acetylene compound with two polyethylene oxide chains having 40 wt % of polyethylene oxide groups from Air Products |
| NON02 | SYNPERONIC ® 13/6.55 | a tridecylpolyethylene-glycol |
| NON03 | ZONYL ® FSO-100: | a mixture of ethoxylated fluoro-surfactants with the formula: $F(CF_2CF_2)_{1-7}CH_2CH_2O(CH_2CH_2O)_yH$ where y = 0 to ca. 15 from DuPont; |
| NON04 | ARKOPAL ™ N060: | a nonylphenylpolyethylene-glycol from HOECHST |
| NON05 | FLUORAD ® FC129: | a fluoroaliphatic polymeric ester from 3M |
| NON06 | PLURONIC ® L35 | a polyethylene-glycol/propylene-glycol |
| NON07 | TEGOGLIDE ® 410: | a polysiloxane-polymer copolymer surfactant, from Goldschmidt; |
| NON08 | TEGOWET ®: | a polysiloxane-polyester copolymer surfactant, from Goldschmidt; |
| NON09 | FLUORAD ® FC126: | a mixture of ammonium salts of perfluorocarboxylic acids, from 3M; |
| NON10 | FLUORAD ® FC430: | a 98.5% active fluoroaliphatic ester from 3M; |
| NON11 | FLUORAD ® FC431: | $CF_3(CF_2)_7SO_2(C_2H_5)N-CH_2CO-(OCH_2CH_2)_nOH$ from 3M; |
| NON12 | | Polyoxyethylene-10-lauryl ether |
| NON13 | ZONYL ® FSN: | a 40% by weight solution of $F(CF_2CF_2)_{1-9}CH_2CH_2O(CH_2CH_2O)_xH$ in a 50% by weight solution of isopropanol in water where x = 0 to about 25, from DuPont; |
| NON14 | ZONYL ® FSN-100: | $F(CF_2CF_2)_{1-9}CH_2CH_2O(CH_2CH_2O)_xH$ where x = 0 to about 25, from DuPont; |
| NON15 | ZONYL ® FS300: | a 40% by weight aqueous solution of a fluorinated surfactant, from DuPont; |
| NON16 | ZONYL ® FSO: | a 50% by weight solution of a mixture of ethoxylated fluoro-surfactants with the formula: $F(CF_2CF_2)_{1-7}CH_2CH_2O(CH_2CH_2O)_yH$ where y = 0 to ca. 15 in a 50% by weight solution of ethylene glycol in water, from DuPont; |

According to a thirtieth embodiment of the process, according to the present invention, the aqueous fountain medium further contains an anionic surfactant. Suitable anionic surfactants include:

AN01 HOSTAPON® T a 95% concentrate of purified sodium salt of N-methyl-N-2-sulfoethyl-oleylamide, from HOECHST

AN02 LOMAR®

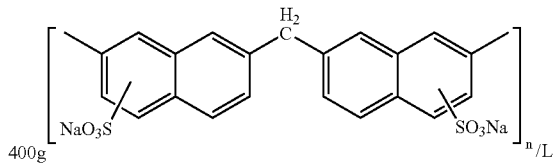

400g

AN03 AEROSOL® OT an aqueous solution of 10 g/L of the sodium salt of the di-2-ethylhexyl ester of sulphosuccinic acid from American Cyanamid AN04 DOWFAX 2A1 a 45% by weight aqueous solution of a mixture of the sodium salt of bis (p-dodecyl, sulpho-phenyl)-ether and the sodium salt of (p-dodecyl, sulpho-phenyl)(sulpho-phenyl)ether from Dow Corning AN05 SPREMI tetraethylammonium perfluoro-octylsulphonate AN06 TERGO sodium 1-isobutyl,4-ethyl-n-octylsulphate AN07 ZONYL® 7950 a fluorinated surfactant, from DuPont;

AN08 ZONYL® FSA a 25% by weight solution of F($CF_2CF_2$)$_{1-9}$$CH_2$$CH_2$S$CH_2$$CH_2$COOLi in a 50% by weight solution of isopropanol in water, from DuPont;

AN09 ZONYL® FSE: 14% by weight solution of [F($CF_2CF_2$)$_{1-7}$$CH_2$$CH_2$O]$_x$P(O) (O$NH_4$)$_y$, where x=1 or 2; y=2 or 1; and x+y=3 in a 70% by weight solution of ethylene glycol in water, from DuPont;

AN10 ZONYL® FSJ: 40% by weight solution of a blend of F($CF_2CF_2$)$_{1-7}$$CH_2$$CH_2$O]$_x$P(O) (O$NH_4$)$_y$, where x=1 or 2; y=2 or 1; and x+y=3 with a hydrocarbon surfactant in 25% by weight solution of isopropanol in water, from DuPont;

AN11 ZONYL® FSP 35% by weight solution of [F($CF_2CF_2$)$_{1-7}$$CH_2$$CH_2$O]$_x$P(O) (O$NH_4$)$_y$, where x=1 or 2; y=2 or 1 and x+y=3 in 69.2% by weight solution of isopropanol in water, from DuPont;

AN12 ZONYL® UR: [F($CF_2CF_2$)$_{1-7}$$CH_2$$CH_2$O]$_x$P(O) (OH) where x=1 or 2; y=2 or 1 and x+y=3, from DuPont;

AN13 ZONYL® TBS: 33% by weight solution of F($CF_2CF_2$)$_{3-8}$$CH_2$$CH_2$$SO_3$H in a 4.5% by weight solution of acetic acid in water, from DuPont;

AN14 ammonium salt of perfluoro-octanoic acid.

According to a thirty-first embodiment of the process, according to the present invention, the aqueous fountain medium further contains an amphoteric surfactant. Suitable amphoteric surfactants include:

AMP01 AMBITERIC® H a 20% by weight solution of hexadecyldimethyl-ammonium acetic acid in ethanol Preparation Process for the Aqueous Fountain Medium According to a thirty-second embodiment of the process, according to the present invention, the process further includes a process for preparing the aqueous fountain medium.

The process for preparing the aqueous fountain medium containing an intrinsically conductive polymer used in the process, according to the present invention, uses an intrinsically conductive polymer in a state dry to the touch or as an aqueous solution or dispersion. If in a state dry to the touch, the intrinsically conductive polymer must be readily dispersible or soluble in an aqueous medium. An example of a dry to the touch intrinsically conductive polymer which is readily dispersible in an aqueous medium is obtainable by freeze drying an aqueous dispersion of a latex comprising a polyanion and a polymer or copolymer of a substituted or unsubstituted thiophene as disclosed in WO 02/00759, herein incorporated by reference. Alternatively a solution or dispersion of an intrinsically conductive polymer in an aqueous medium can simply be evaporated as, for example, disclosed in WO 99/34371.

According to a thirty-third embodiment of the process, according to the present invention, the process further contains a process for preparing the aqueous fountain medium using an intrinsically conductive polymer obtained by freeze drying an aqueous dispersion of a latex comprising a polyanion and a polymer or copolymer of a substituted or unsubstituted thiophene.

Receiving Medium

According to a thirty-fourth embodiment of the process, according to the present invention, is any medium receiving medium suitable for offset printing.

According to a thirty-fifth embodiment of the process, according to the present invention, the receiving medium is paper, coated paper, a metallic foil or a plastic sheet.

The receiving medium may be translucent, transparent or opaque. Suitable plastic sheets include a polymer laminate, a thermoplastic polymer foil or a duroplastic polymer foil e.g. made of a cellulose ester, cellulose triacetate, polypropylene, polycarbonate or polyester, with poly(ethylene terephthalate) or poly(ethylene naphthalene-1,4-dicarboxylate) being particularly preferred.

INDUSTRIAL APPLICATION

The process according to the present invention can, for example, be used to produce functional patterns with a wide range of applications and in particular conductive patterns for a multiplicity of applications including electroplating with metallic layers, the production of electrical circuitry for single and limited use items such as toys, in capacitive antennae as part of radiofrequency tags, in electroluminescent devices which can be used in lamps, displays, backlights e.g. LCD, automobile dashboard and keyswitch backlighting, emergency lighting, cellular phones, personal digital assistants, home electronics, indicator lamps and other applications in which light emission is required.

The invention is illustrated hereinafter by way of COMPARATIVE EXAMPLES and INVENTION EXAMPLES. The percentages and ratios given in these examples are by weight unless otherwise indicated.

| receiving medium nr | |
|---|---|
| 1 | RC-paper GN 279 from Schoeller a 110 g/m² paper coated either side with a layer containing 19 g polyethylene/m² on one side and a layer containing 19 g polyethylene/m² and $TiO_2$ on the other side (side used for printing) |
| 2 | coated paper: ALLEGRO ® GLOSS (115 g/m²) |
| 3 | 175 μm thick PET with a subbing layer No. 01 |
| 4 | 175 μm thick AGFAJET ™ UFF from AGFA-GEVAERT N.V. |

Subbing layer Nr. 01 has the composition:

| | |
|---|---|
| copolymer of 88% vinylidene chloride, 10% methyl acrylate and 2% itaconic acid | 79.1% |
| Kieselsol ® 100 F, a colloidal silica from BAYER | 18.6% |
| Mersolat ® H, a surfactant from BAYER | 0.4% |
| Ultravon ® W, a surfactant from CIBA-GEIGY | 1.9% |

Ingredients used in the COMPARATIVE and INVENTION EXAMPLES:

IR-absorbing dyes:

IR01=

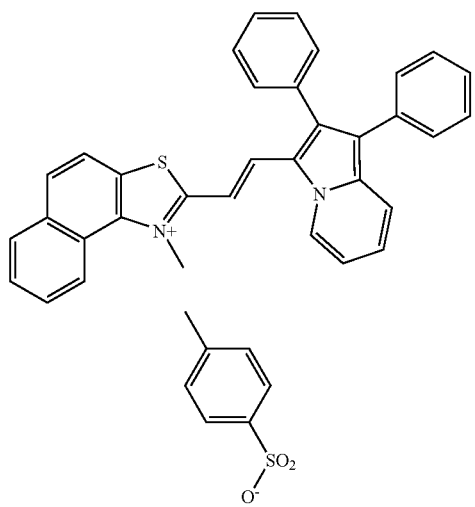

CHARACTERIZATION OF THE RECEIVING MEDIA USED IN THE COMPARATIVE AND INVENTION EXAMPLES

The pore size distribution of the receiving media used in the COMPARATIVE and INVENTION EXAMPLES were characterized by mercury porosimetry with a MICROMERETICS AutoPore IV Model 9500 mercury porosimeter with V1.05 software. The characteristics of the mercury were:

advancing contact angle=130°
receding contact angle=130°
surface tension=4.85 mN/cm (485 dynes/cm)
density=13.5335 g/mL The low pressure measurements were carried out at a pressure of 6.66 N m$^{-2}$ (50 μm Hg) with a mercury filling pressure of 0.0177 MPa and an equilibration time of 50 s. The high pressure measurements were also carried out with an equilibration time of 50 s.

The total pore volume was determined for the pore size range of 3-75000 nm for receiving media 1, 2 and 3, see Table 1. The pore volume and size distributions are also given in Table 1 for the pore size range 100-3500 nm for receiving medium 1 and for the pore size ranges 12-250 nm and 250-4500 nm for receiving medium 2.

TABLE 1

| receiving medium nr | Total pore volume [mL/m$^2$] | pore range [nm] | % to total volume | pore volume [mL/m$^2$] | d50 [nm] |
|---|---|---|---|---|---|
| 1 | 35 | 100-3500 | 79 | 28 | 1425 |
| 2 | 22 | 12-250 | 29 | 6 | 92 |
|   |    | 250-4500 | 59 | 13 | 1370 |
| 3 | 6 | — | — | — | — |

Both receiving media 1 and 2 included macropores i.e. pores greater than 50 nm in diameter. Mesopores i.e. pores with diameters between 2 and 50 nm were present in receiving medium 2. The total pore volume of receiving medium 3 is completely due to compression at high pressures, since BET nitrogen adsorption measurements using a Micromeretics ASAP 2400 showed no pores in the measurement range 2 to 100 nm.

AQUEOUS PEDOT/PSS DISPERSIONS USED IN THE COMPARATIVE AND INVENTION EXAMPLES

A 1.2% by weight aqueous dispersion of PEDOT/PSS containing a weight ratio PEDOT to PSS of 1:2.4 was prepared as disclosed in EP-A 440 957 and had a typical viscosity measured using an AR1000 plate and cone rheometer (diameter 4 cm; cone angle 2°) at 20° C. of 38 mPa.s at a shear rate of 5 s$^{-1}$ decreasing to 33.5 mPa.s at a shear rate of 35 s$^{-1}$ and has a typical pH of 1.9. A 3% by weight dispersion of PEDOT/PSS was then prepared from this 1.2% by weight dispersion by evaporating 60.7% by weight of the water with stirring at a temperature of 75° C. and a pressure of 50 mbar.

PRINTING PLATES USED IN THE COMPARATIVE AND INVENTION EXAMPLES

Printing plates 1 and 2 were prepared by doctor-blade coating a 175 μm subbed PET support to a wet layer thickness of 40 μm with the following compositions:

|  | Printing plate 1 | Printing plate 2 |
|---|---|---|
| poly(tetrahydropyran-2-yl methacrylate) | 0.90 g | — |
| copolymer of tetrahydropyran-2-yl methacrylate & methyl methacrylate | — | 0.90 g |
| IR01, an IR-absorbing dye | 0.10 g | 0.10 g |
| TEGOGLIDE ™ 410 (2% solution) | 0.03 g | 0.03 g |
| 2-butanone | 14.97 g | 14.97 g |
| Total | 16.0 g | 16.0 g | giving ingredient coverages of:

|  | Printing plate 1 | Printing plate 2 |
|---|---|---|
| poly(tetrahydropyran-2-yl methacrylate) | 1.80 g/m$^2$ | — |
| copolymer of tetrahydropyran-2-yl methacrylate & methyl methacrylate | — | 1.80 g/m$^2$ |
| IR01, an IR-absorbing dye | 0.20 g/m$^2$ | 0.20 g/m$^2$ |
| TEGOGLIDE ™ 410 (2% solution) | 0.0012 g/m$^2$ | 0.0012 g/m$^2$ |

Printing plates 3 and 4 are commercially available from AGFA-GEVAERT N.V.:

Printing plate 3: THERMOSTAR™ P970/15
Printing plate 4: SETPRINT™ SET/R

AQUEOUS FOUNTAIN MEDIA

Twelve aqueous fountain media were used in the INVENTION EXAMPLES:

| Aqueous fountain medium | |
|---|---|
| AFM-01 | aqueous dispersion with 1.2% PEDOT/PSS |
| AFM-02 | aqueous dispersion with 1.2% PEDOT/PSS and 5.0% NMP |
| AFM-03 | aqueous dispersion with 3.0% PEDOT/PSS |
| AFM-04 | aqueous dispersion with 2.8% PEDOT/PSS and 7.5% NMP |
| AFM-05 | aqueous dispersion with 2.8% PEDOT/PSS and 15% NMP |
| AFM-06 | aqueous dispersion with 2.8% "improved" PEDOT/PSS and 7.5% NMP |
| AFM-07 | aqueous solution with 1% Tinopal SHP |
| AFM-08 | aqueous solution with 1% Blancophor BSU |
| AFM-09 | aqueous solution with 1% Leucopur PAM |
| AFM-10 | aqueous solution with 1% sodium fluorescein |
| AFM-11 | aqueous dispersion with 1% TIEP, a type of $TiO_2$ |
| AFM-12 | aqueous dispersion with 1% $CaWO_3$ dispersed with polyvinyl alcohol | and two in the COMPARATIVE EXAMPLES:

| Aqueous fountain medium | |
|---|---|
| AFM-C01 | G671C fountain solution from AGFA-GEVAERT, an aqueous solution containing 5% isopropanol |
| AFM-C02 | 3.0% aqueous solution of poly (styrenesulphonic acid) |

COMPARATIVE EXAMPLES 1 AND INVENTION EXAMPLES 1 TO 3

Printing experiments were carried out with a 360 offset printer from A. B. Dick with NOVAQUICK™ schwarz 123W, a black offset ink from BASF, using printing plates, aqueous fountain media and receiving media given in Table 2 below.

In COMPARATIVE EXAMPLE 1 a standard aqueous fountain medium, AFM-C01, was used with printing plate nr. 4, NOVAQUICK™ schwarz 123W being used as the printing ink.

In INVENTION EXAMPLES 1 to 3, aqueous fountain medium AFM-02, a 3% by weight dispersion of PEDOT/PSS, was used as the aqueous fountain medium with printing plates 1, 2 and 3 respectively.

For each example, the aqueous fountain medium was deposited on the fountain roll and the NOVAQUICK™ schwarz 123W printing ink was deposited on the ink roll with the aqueous fountain being applied to the printing plate before the printing ink. Printing was started after 10 revolutions of the fountain roll and 5 revolutions of the ink roll. 30 sheets of the receiving medium were printed in each case and the surface resistances of the "inked" and "non-inked" areas measured with a two point method using a "Surface Resistance Checker" from DALCON DULLAERT (ESD CONTROL). The surface resistances of the inked and non-inked areas are also given in Table 2.

TABLE 2

| Comparative Example nr. | Printing plate nr. | Aqueous fountain medium nr. | receiving medium nr. | Surface resistance of inked area [$\Omega$/square] | Surface resistance of non-inked areas [$\Omega$/square] |
|---|---|---|---|---|---|
| 1 | 4 | AFM-C01 | 1 | $10^{11}$ | $10^{11}$ |
| Invention Example nr. | | | | | |
| 1 | 1 | AFM-03 | 1 | $10^{11}$ | $10^{9}$ |
| 2 | 2 | AFM-03 | 1 | $10^{11}$ | $10^{9}$ |
| 3 | 3 | AFM-03 | 1 | $10^{10}$ | $10^{8}$ |

The surface resistances of the inked and inked areas of prints obtained in INVENTION EXAMPLE 3 were monitored as a function of the number of the print and for each print the evolution of the surface resistance values monitored under different conditions as a function of time. The results are given in Table 3 for prints stored in the dark.

The results in Table 3 show that the differentiation in surface resistance between the "inked" and "non-inked" areas in the dark increase with time and is unaffected by UV-exposure.

TABLE 3

| time after printing | surface resistance of print 1 [$\Omega$/square] | | surface resistance of print 5 [$\Omega$/square] | | surface resistance of print 10 [$\Omega$/square] | | surface resistance of print 20 [$\Omega$/square] | | surface resistance of print 30 [$\Omega$/square] | |
|---|---|---|---|---|---|---|---|---|---|---|
| | non-inked areas | inked area | non-inked areas | inked area | non-inked areas | inked area | non-inked areas | inked area | non-inked areas | inked area |
| 1 h | | | $10^{8}$ | $10^{11}$ | | | | | $10^{8}$ | $10^{10}$ |
| 3 h | | | | | | | | | $10^{8}$ | $10^{12}$ |
| 5 h | $10^{9}$ | $10^{10}$ | | | $10^{8}$ | $10^{12}$ | $10^{8}$ | $10^{11}$ | $10^{8}$ | $10^{12}$ |
| 6 h | $10^{8}$ | $10^{11}$ | | | $10^{8}$ | $10^{11}$ | $10^{8}$ | $10^{11}$ | $10^{8}$ | $10^{11}$ |
| 3 days | $10^{8}$ | $10^{11}$ | $10^{8*}$ | $10^{11*}$ | $10^{8}$ | $10^{11}$ | $10^{8}$ | $10^{11}$ | $10^{8}$ | $10^{11}$ |
| 4 days | $10^{8}$ | $10^{11}$ | | | $10^{8}$ | $10^{10}$ | $10^{8}$ | $10^{11}$ | $10^{8}$ | $10^{11}$ |
| 5 days | $10^{8}$ | $10^{11}$ | | | $10^{8}$ | $10^{11}$ | $10^{8}$ | $10^{11}$ | $10^{8}$ | $10^{11}$ |
| 7 days | $10^{8}$ | $10^{11}$ | | | $10^{8}$ | $10^{11}$ | $10^{8}$ | $10^{11}$ | $10^{8}$ | $10^{11}$ |

*no change in surface resistance upon additional 15 minutes UV-exposure to a 1200 W halogen lamp with an intensity of 40 W/m²

Table 4 shows the evolution in the surface resistances of the "inked" and "non-inked" areas with time upon exposure to direct and non-direct sunlight for prints produced in INVENTION EXAMPLE 3.

TABLE 4

| time after printing | Surface resistance of print 6 upon exposure to direct sunlight | | Surface resistance of print 25 upon exposure to non-direct sunlight | |
|---|---|---|---|---|
| | non-inked areas | inked area | non-inked areas | inked area |
| 1 h | $10^8$ | $10^{11}$ | $10^8$ | $10^{11}$ |
| 2 days | $10^8$ | $10^{11}$ | $10^8$ | $10^{11}$ |
| 3 days | $10^9$ | $10^{11}$ | $10^8$ | $10^{11}$ |
| 4 days | $10^9$ | $10^{12}$ | $10^8$ | $10^{11}$ |
| 5 days | — | — | $10^8$ | $10^{11}$ |
| 7 days | — | — | $10^9$ | $10^{12}$ |

The differentiation in surface resistance between the "inked" and "non-inked" areas does not change with time upon exposure to direct 15 or non-direct sunlight, although after 3 days exposure to direct sunlight the surface resistance of the inked areas increased from $10^8$ Ω/square to $10^9$ Ω/square.

INVENTION EXAMPLES 4 TO 19 AND COMPARATIVE EXAMPLES 2 TO 6

INVENTION EXAMPLES 4 to 19 and COMPARATIVE EXAMPLES 2 to 6 were carried out as described for INVENTION EXAMPLES 1 to 3 and COMPARATIVE EXAMPLE 1 except that the printing ink used was NOVAVIT™ gelb 1 F 713, a yellow offset ink from BASF, printing plate nr. 3 was used, receiving medium used were types 1 to 3 and the aqueous fountain media AFM01 to AFM06 and AFM-C01 and AFM-C02 were used as specified for INVENTION EXAMPLES 4 to 19 and for COMPARATIVE EXAMPLES 2 to 6 in Table 5.

30 sheets of the receiving medium were printed in each case and the surface resistances of the "inked" and "non-inked" areas measured with a two point method as described for INVENTION EXAMPLES 1 to 3 and COMPARATIVE EXAMPLE 1. The surface resistances of the inked and non-inked areas are also given in Table 5.

Little conductivity enhancement was observed with aqueous fountain medium containing NMP upon immediately heating for 10 minutes at 110° C. However, that enhancement with NMP is feasible was shown by dipping the prints of INVENTION EXAMPLES 11 in NMP for 20 s and then heating for 20 minutes at 110° C., which resulted in a thousand-fold reduction of the surface resistance in the non-printed areas from $10^8$ to $10^5$ ohm/square i.e. an increase in the ratio of surface resistance of the printed area to that of the non-printed area from $10^3$ to $10^6$.

TABLE 5

| | Aqueous fountain medium nr. | receiving medium nr. | Surface resistance of inked area [Ω/square] | | Surface resistance of non-inked areas [Ω/square] | |
|---|---|---|---|---|---|---|
| | | | without heating | + immediate heating for 10 min/110° C. | without heating | + immediate heating for 10 min/110° C. |
| Comparative Example nr | | | | | | |
| 2 | AFM-C01 | 1 | $10^{12}$ | — | $10^{12}$ | — |
| 3 | AFM-C01 | 2 | $10^{12}$ | — | $10^{12}$ | — |
| 4 | AFM-C02 | 1 | $10^{10}$ | $10^{11}$ | $10^{10}$ | $10^{11}$ |
| 5 | AFM-C02 | 2 | $10^{10}$ | $10^{11}$ | $10^{10}$ | $10^{11}$ |
| 6 | AFM-C02 | 3 | $10^{11}$ | $10^{12}$ | $10^{11}$ | $10^{12}$ |
| Invention Example nr | | | | | | |
| 4 | AFM-01 | 1 | $10^{12}$ | — | $10^{11}$ | — |
| 5 | AFM-01 | 2 | $10^{12}$ | — | $10^{11}$ | — |
| 6 | AFM-02 | 1 | $10^{12}$ | — | $10^{12}$ | — |
| 7 | AFM-02 | 2 | $10^{12}$ | — | $10^{11}$ | — |
| 8 | AFM-03 | 1 | $10^{10}$ | — | $10^8$ | — |
| 9 | AFM-03 | 2 | $10^{10}$ | — | $10^8$ | — |
| 10 | AFM-04 | 1 | $10^{11}$ | $10^{12}$ | $10^8$ | $10^{11}$ |
| 11 | AFM-04 | 2 | $10^{11}$ | $10^{11}$ | $10^8$ | $10^8$ |
| 12 | AFM-04 | 3 | $10^{11}$ | $10^{12}$ | $10^8$ | $10^8$ |
| 13 | AFM-05 | 1 | $10^{12}$ | $10^{12}$ | $10^{12}$ | $10^{12}$ |
| 14 | AFM-05 | 2 | $10^{11}$ | $10^{11}$ | $10^8$ | $10^7$ |
| 15 | AFM-05 | 2 | $10^9$ | — | $10^7$ | — |
| 16 | AFM-05 | 2 twice* | $10^9$ | — | $10^6$ | — |
| 17 | AFM-05 | 3 | $10^{10}$ | $10^{11}$ | $10^7$ | $10^7$ |
| 18 | AFM-06 | 1 | $10^{11}$ | $10^{10}$ | $10^{10}$ | $10^9$ |
| 19 | AFM-06 | 2 | $10^{10}$ | $10^{11}$ | $10^7$ | $10^7$ |
| 19 | AFM-06 | 3 | $10^{11}$ | $10^{11}$ | $10^8$ | $10^7$ |

*two passes

Further heating experiments showed that, by varying the temperature and heating time immediately after printing for the prints of INVENTION EXAMPLE 15 with a single pass and those of INVENTION EXAMPLE 16 with two passes, higher ratios of surface resistance of the printed area to that of the non-printed area could be obtained, as can be seen from Table 6.

TABLE 6

| | Surface resistance of non-inked area [Ω/square] | | | | Surface resistance of inked areas [Ω/square] | | | |
|---|---|---|---|---|---|---|---|---|
| | 15 s | 30 s | 40 s | 60 s | 15 s | 30 s | 40 s | 60 s |
| Invention Example Nr. 15 | | | | | | | | |
| 90° C. | — | $10^7$ | $10^7$ | $10^7$ | — | $10^{9.5}$ | $10^{10}$ | $10^{10}$ |
| 110° C. | $10^7$ | $10^7$ | — | $10^7$ | $10^{10}$ | $10^{10}$ | — | $10^{10}$ |
| Invention Example Nr. 16 | | | | | | | | |
| 90° C. | — | $10^6$ | $10^6$ | $10^6$ | — | $10^8$ | $10^8$ | $10^9$ |
| 110° C. | $10^6$ | $10^6$ | — | $10^5$ | $10^9$ | $10^9$ | — | $10^9$ |

The best heating conditions were found to be 60s at 110° C. This produced a ratio of surface resistance of the printed area to that of the non-printed area for the twice printed print of INVENTION EXAMPLE 16 of $10^4$.

INVENTION EXAMPLE 20 AND COMPARATIVE EXAMPLE 7

INVENTION EXAMPLE 20 and COMPARATIVE EXAMPLE 7 were carried out as described for INVENTION EXAMPLES 1 to 3 and COMPARATIVE EXAMPLE 1 except that the printing ink used was either NOVAVIT gelb 1 F 713, a yellow offset ink from BASF, or no printing ink was used at all, printing plate nr. 3 was used, the receiving media used were type 1 and the aqueous fountain media AFMO3 was used as specified for INVENTION EXAMPLE 20 and for COMPARATIVE EXAMPLE 7 in Table 7.

30 sheets of the receiving medium were printed in each case and the surface resistances of the "inked" and "non-inked" areas measured with a two point method as described for INVENTION EXAMPLES 1 to 3 and COMPARATIVE EXAMPLE 1. The surface resistances of the inked and non-inked areas are also given in Table 7.

The evolution of conductivity differentiation between areas of the prints corresponding to the image and non-image areas of the printing plate for INVENTION EXAMPLE 20 using the NOVAVIT™ gelb 1 F 13 ink and aqueous fountain medium AFMO3 showed that the conductivity differentiation increased with the number of prints up to 5 prints and then stabilized, whereas the conductivity differentiation between areas of the prints corresponding to the image and non-image areas of the printing plate in the case of COMPARATIVE EXAMPLE 7 in which only the aqueous fountain medium AFM03 was used no conductivity differentiation was observed from the 10th print.

This showed that any conductivity differentiation simply due to different affinity of the aqueous fountain medium for hydrophilic areas on the printing plate was rapidly lost during a printing run, whereas in the presence of a printing ink a stable conductivity differentiation was realized once the printing was in regime, as taught by the present invention.

TABLE 7

| Print nr | Use of NOVAVIT gelb 1 F 713 | receiving medium nr. | Surface resistance of inked area [Ω/square] | Surface resistance of non-inked areas [Ω/square] |
|---|---|---|---|---|
| Comparative Example nr. 7 | | | | |
| 1 | no | 2 | $10^{10}$ | $10^8$ |
| 5 | no | 2 | $10^{10}$ | $10^9$ |
| 10 | no | 2 | $10^9$ | $10^9$ |
| 15 | no | 2 | $10^9$ | $10^9$ |
| Invention Example nr. 20 | | | | |
| 1 | yes | 2 | $10^{10}$ | $10^8$ |
| 5 | yes | 2 | $10^{11}$ | $10^8$ |
| 10 | yes | 2 | $10^{11}$ | $10^8$ |
| 15 | yes | 2 | $10^{11}$ | $10^8$ |

INVENTION EXAMPLES 21 TO 32

Printing experiments were carried out with a 360 offset printer from A. B. Dick with NOVAVIT F 700 SPEED, a yellow offset ink from BASF, using printing plates, aqueous fountain media and receiving media given in Table 8 below.

For each of INVENTION EXAMPLES 21 to 32, the aqueous fountain medium was deposited on the fountain roll and the NOVAVIT™ F 700 SPEED printing ink was deposited on the ink roll with the aqueous fountain being applied to the printing plate before the printing ink. Printing was started after 10 revolutions of the fountain roll and 5 revolutions of the ink roll. 50 sheets of the receiving medium were printed in each case and the effect of a 365 nm light source on the 25th print observed from the same side as the light source. The observations are represented by numerical assessment numbers 1 to 4, where these numbers represent:

| numerical assessment nr 1 | = | very bright |
| numerical assessment nr 2 | = | bright |
| numerical assessment nr 3 | = | dark |
| numerical assessment nr 4 | = | very dark |

Evidence of deposition in the areas not printed with the yellow ink is that these areas should, upon exposure with the 365 nm lamp, appear brighter than the edges of the receiving medium not involved in the printing process.

TABLE 8

| Invention Example nr. | Printing plate nr. | Aqueous fountain medium nr. | Receiving medium nr. | yellow inked area | hydrophilic area wetted by fountain | areas not involved in the printing process |
|---|---|---|---|---|---|---|
| 22 | 3 | AFM-07 | 3 | very dark | bright | dark |
| 23 | 3 | AFM-07 | 4 | very dark | bright | dark |
| 24 | 3 | AFM-08 | 3 | very dark | bright | dark |
| 25 | 3 | AFM-08 | 4 | very dark | bright | dark |
| 26 | 3 | AFM-09 | 3 | very dark | bright | dark |
| 27 | 3 | AFM-09 | 4 | very dark | bright | dark |
| 28 | 3 | AFM-10 | 3 | very dark | bright | dark |
| 29 | 3 | AFM-10 | 4 | very dark | bright | dark |
| 30 | 3 | AFM-11 | 4 | very dark | bright | dark |
| 31 | 3 | AFM-12 | 3 | very dark | bright | dark |
| 32 | 3 | AFM-12 | 4 | very dark | bright | dark |

Therefore, in all of INVENTION EXAMPLES 22 to 32, the receiving medium exhibits a fluorescence whitening effect with respect to the edges of the receiving medium, which were not involved in the printing process i.e. had not come into contact with either the fountain roll or the ink roll.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A process for the offset printing of a receiving medium with a functional pattern comprising in any order the steps of: applying a printing ink to a printing plate and wetting said printing plate with a fountain comprising a fountain medium comprising between 50% by weight and 100% by weight of water thereby providing said printing plate with an area inked with said printing ink and an area coated with said fountain, and transferring said printing ink and fountain onto said receiving medium, wherein said fountain further comprises as a solution or a dispersion in said fountain medium at least one moiety having at least pH-indicating, whitening, fluorescent, phosphorescent, X-ray phosphor or polymeric intrinsically conductive properties, wherein said moiety having at least pH-indicating, whitening, fluorescent, phosphorescent, X-ray phosphor or polymeric intrinsically conductive properties is a polymer or copolymer of a 3,4-dialkoxythiophene in which the two alkoxy groups may be the same or different or together represent an optionally substituted oxy-alkylene-oxy bridge, a functional pattern of said at least one moiety is provided on said receiving medium, and a pH-indicator pattern is provided when said fountain comprises at least one moiety having at least pH-indicating properties.

2. The process according to claim 1, wherein said intrinsically conductive polymer is selected from the group consisting of polyanilines, polyaniline derivatives, polypyrroles, polypyrrole derivatives, polythiophenes and polythiophene derivatives.

3. The process according to claim 1, wherein said intrinsically conductive polymer is selected from the group consisting of: homopolymers of (3,4-methylenedioxythiophene), (3,4-methylenedioxythiophene) derivatives, (3,4-ethylenedioxythiophene), (3,4-ethylenedioxythiophene) derivatives, (3,4-propylenedioxythiophene), (3,4-(propylenedioxythiophene) derivatives, (3,4-butylenedioxythiophene) and (3,4-butylenedioxythiophene) derivatives and copolymers thereof.

4. The process according to claim 1, wherein said aqueous fountain medium further comprises a polyanion.

5. The process according to claim 4, wherein said polyanion is poly(styrenesulfonate).

6. The process according to claim 1, wherein said aqueous fountain medium further comprises a di- or polyhydroxy- and/or carboxy groups or amide or lactam group containing organic compound.

7. The process according to claim 6, wherein said di- or polyhydroxy- and/or carboxy groups or amide or lactam group containing organic compound is selected from the group consisting of 1,2-propandiol, propylene glycol, diethylene glycol, N-methyl pyrrolidinone and di(ethylene glycol)ethyl ether acetate.

8. The process according to claim 6, wherein said process further comprises heating said receiving medium within 10 minutes after printing to a temperature of 100° C. to 250° C.

9. The process according to claim 1, wherein said fountain further comprises a non-ionic or anionic surfactant.

10. The process according to claim 1, wherein said fountain has a viscosity at 25° C. after stirring to constant viscosity of 30 mPa.s as measured according to DIN 53211.

11. A process, for the offset printing of a receiving medium with a functional pattern comprising in any order the steps of:

applying a printing ink to a printing plate and wetting said printing plate with a fountain comprising a fountain medium comprising between 50% by weight and 100% by weight of water thereby providing said printing plate with an area inked with said printing ink and an area coated with said fountain, and transferring said printing ink and fountain onto said receiving medium, wherein said fountain further comprises as a solution or a dispersion in said fountain medium at least one moiety having at least pH-indicating, whitening, fluorescent, phosphorescent, X-ray phosphor or polymeric intrinsically conductive properties, wherein a functional pattern of said at least one moiety is provided on said receiving medium, and wherein a pH-indicator pattern is provided when said fountain comprises at least one moiety having at least pH-indicating properties, and wherein said aqueous fountain medium further contains an aprotic organic compound with a dielectric constant ≧15.

12. The process according to claim 11, wherein said moiety having at least pH-indicating whitening, fluorescent, phosphorescent, X-ray phosphor, or polymeric intrinsically conductive properties is an intrinsically conductive polymer.

13. The process according to claim 2, wherein said intrinsically conductive polymer is selected from the group consisting of polyanilines, polyaniline derivatives, polypyrroles, polypyrrole derivatives, polythiophenes and polythiophene derivatives.

14. The process according to claim 13, wherein said intrinsically conductive polymer is a polymer or copolymer of a 3,4-dialkoxythiophene in which the two alkoxy groups may be the same or different or together represent an optionally substituted oxy-alkylene-oxy bridge.

15. The process according to claim 13, wherein said intrinsically conductive polymer is selected from the group consisting of: homopolymers of (3,4-methylenedioxythiophene), (3,4-methylenedioxythiophene) derivatives, (3,4-ethylenedioxy-thiophene), (3,4-ethylenedioxythiophene) derivatives, (3,4-propylenedioxythiophene), (3,4-(propylenedioxythiophene) derivatives, (3,4-butylenedioxythiophene) and (3,4-butylenedioxythiophene) derivatives and copolymers thereof.

16. The process according to claim 11, wherein said process further comprises heating said receiving medium within 10 minutes after printing to a temperature of ≦150° C.

17. The process according to claim 11, wherein said aqueous fountain medium further comprises a polyanion.

18. The process according to claim 17, wherein said polyanion is poly(styrenesulfonate).

19. The process according to claim 11, wherein said aqueous fountain medium further contains a di- or polyhydroxy- and/or carboxy groups or amide or lactam group containing organic compound.

20. The process according to claim 19, wherein said di- or polyhydroxy- and/or carboxy groups or amide or lactam group containing organic compound is selected from the group consisting of 1,2-propandiol, propylene glycol, diethylene glycol, N-methyl pyrrolidinone and di(ethylene glycol)ethyl ether acetate.

21. The process according to claim 19, wherein said process further comprises heating said receiving medium within 10 minutes after printing to a temperature of 100° C. to 250° C.

22. The process according to claim 11, wherein said fountain further comprises a non-ionic or anionic surfactant.

23. The process according to claim 11, wherein said fountain has a viscosity at 25° C. after stirring to constant viscosity of 30 mPa.s as measured according to DIN 53211.

24. A process for the offset printing of a receiving medium with a functional pattern comprising in any order the steps of:

applying a printing ink to a printing plate and wetting said printing plate with a fountain comprising a fountain medium comprising between 50% by weight and 100% by weight of water, said fountain further comprising as a solution or a dispersion in said fountain medium at least one moiety having at least pH-indicating, whitening, fluorescent, phosphorescent, X-ray phosphor, organic conductive or organo-metallic conductive properties, wherein said moiety having at least pH-indicating, whitening, fluorescent, phosphorescent, X-ray phosphor, or organic conductive or organo-metallic conductive properties is an intrinsically conductive polymer, wherein said intrinsically conductive polymer is a polymer or copolymer of a 3,4-dialkoxythiophene in which the two alkoxy groups may be the same or different or together represent an optionally substituted oxy-alkylene-oxy bridge.

25. The process according to claim 24, wherein said intrinsically conductive polymer is selected from the group consisting of: homopolymers of (3,4-methylenedioxythiophene), (3,4-methylenedioxythiophene) derivatives, (3,4-ethylenedioxy-thiophene), (3,4-ethylenedioxythiophene) derivatives, (3,4-propylenedioxythiophene), (3,4-(propylenedioxythiophene) derivatives, (3,4-butylenedioxythiophene) and (3,4-butylene-dioxythiophene) derivatives and copolymers thereof.

26. The process according to claim 24, wherein said aqueous fountain medium further comprises a polyanion.

27. The process according to claim 26, wherein said polyanion is poly(styrenesulfonate).

28. The process according to claim 24, wherein said aqueous fountain medium further contains a di- or polyhydroxy- and/or carboxy groups or amide or lactam group containing organic compound.

29. The process according to claim 28, wherein said di- or polyhydroxy- and/or carboxy groups or amide or lactam group containing organic compound is selected from the group consisting of 1,2-propandiol, propylene glycol, diethylene glycol, N-methyl pyrrolidinone and di(ethylene glycol)ethyl ether acetate.

30. The process according to claim 28, wherein said process further comprises heating said receiving medium within 10 minutes after printing to a temperature of 100 to 250° C.

31. The process according to claim 24, wherein said fountain further comprises a non-ionic or anionic surfactant.

32. The process according to claim 24, wherein said fountain has a viscosity at 25° C. after stirring to constant viscosity of 30 mPa.s as measured according to DIN 53211.

33. A process, for the offset printing of a receiving medium with a functional pattern comprising in any order the steps of:

applying a printing ink to a printing plate and wetting said printing plate with a fountain comprising a fountain medium comprising between 50% by weight and 100% by weight of water thereby providing said printing plate with an area inked with said printing ink and an area coated with said fountain, and transferring said printing ink and fountain onto said receiving medium, wherein said fountain further comprises as a solution or a dispersion in said fountain medium at least one moiety having at least pH-indicating, whitening, fluorescent, phosphorescent, X-ray phosphor, organic conductive or organo-metallic conductive properties, wherein a functional pattern of at least one moiety is provided on said receiving medium, and wherein a pH-indicator pattern is provided when said fountain comprises at least one moiety having at least pH-indicator properties, and wherein said aqueous fountain medium further contains an aprotic organic compound with a dielectric constant ≧15.

34. The process according to claim 33, wherein said intrinsically conductive polymer is selected from the group consisting of polyanilines, polyaniline derivatives, polypyrroles, polypyrrole derivatives, polythiophenes and polythiophene derivatives.

35. The process according to claim 33, wherein said process further comprises heating said receiving medium within 10 minutes after printing to a temperature of $\geq 150°$ C.

36. The process according to claim 33, wherein said intrinsically conductive polymer is a polymer or copolymer of a 3,4-dialkoxythiophene in which the two alkoxy groups may be the same or different or together represent an optionally substituted oxy-alkylene-oxy bridge.

37. The process according to claim 33, wherein said intrinsically conductive polymer is selected from the group consisting of: homopolymers of (3,4-methylenedioxythiophene), (3,4-methylenedioxythiophene) derivatives, (3,4-ethylenedioxy-thiophene), (3,4-ethylenedioxythiophene) derivatives, (3,4-propylenedioxythiophene), (3,4-(propylenedioxythiophene) derivatives, (3,4-butylenedioxythiophene) and (3,4-butylene-dioxythiophene) derivatives and copolymers thereof.

38. The process according to claim 33, wherein said aqueous fountain medium further comprises a polyanion.

39. The process according to claim 38, wherein said polyanion is poly(styrenesulfonate).

40. The process according to claim 33, wherein said aqueous fountain medium further contains a di- or polyhydroxy- and/or carboxy groups or amide or lactam group containing organic compound.

41. The process according to claim 40, wherein said di- or polyhydroxy- and/or carboxy groups or amide or lactam group containing organic compound is selected from the group consisting of 1,2-propandiol, propylene glycol, diethylene glycol, N-methyl pyrrolidinone and di(ethylene glycol)ethyl ether acetate.

42. The process according to claim 40, wherein said process further comprises heating said receiving medium within 10 minutes after printing to a temperature of 100 to 250° C.

43. The process according to claim 33, wherein said fountain further comprises a non-ionic or anionic surfactant.

44. The process according to claim 33, wherein said fountain has a viscosity at 25° C. after stirring to constant viscosity of 30 mPa.s as measured according to DIN 53211.

45. A process, for the offset printing of a receiving medium with a functional pattern comprising in any order the steps of:
applying a printing ink to a printing plate and wetting said printing plate with a fountain comprising a fountain medium which comprises water, said fountain further comprising as a solution or dispersion in said fountain medium at least one moiety which is an intrinsically conductive polymer, wherein a functional pattern of said intrinsically conductive polymer is provided on said receiving material when said fountain is transferred to said receiving medium, and wherein intrinsically conductive polymer is a polymer or copolymer of a 3,4-dialkoxythiophene in which the two alkoxy groups may be the same or different or together represent an optionally substituted oxy-alkylene-oxy bridge.

46. The process according to claim 45, wherein said intrinsically conductive polymer is selected from the group consisting of: homopolymers of (3,4-methylenedioxythiophene), (3,4-methylenedioxythiophene) derivatives, (3,4-ethylenedioxythiophene), (3,4-ethylenedioxythiophene) derivatives, (3,4-propylenedioxythiophene), (3,4-(propylenedioxythiophene) derivatives, (3,4-butylenedioxythiophene) and (3,4-butylenedioxythiophene) derivatives and copolymers thereof.

47. The process according to claim 45, wherein said aqueous fountain medium further comprises a polyanion.

48. The process according to claim 47, wherein said polyanion is poly(styrenesulfonate).

49. The process according to claim 45, wherein said aqueous fountain medium further comprises a di- or polyhydroxy- and/or carboxy groups or amide or lactam group containing organic compound.

50. The process according to claim 49, wherein said di- or polyhydroxy- and/or carboxy groups or amide or lactam group containing organic compound is selected from the group consisting of 1,2-propandiol, propylene glycol, diethylene glycol, N-methyl pyrrolidinone and di(ethylene glycol)ethyl ether acetate.

51. The process according to claim 49, wherein said process further comprises heating said receiving medium within 10 minutes after printing to a temperature of 100 to 250° C.

52. The process according to claim 45, wherein said fountain further comprises a non-ionic or anionic surfactant.

53. The process according to claim 45, wherein said fountain has a viscosity at 25° C. after stirring to constant viscosity of 30 mPa.s as measured according to DIN 53211.

54. A process, for the offset printing of a receiving medium with a functional pattern comprising in any order the steps of:
applying a printing ink to a printing plate and wetting said printing plate with a fountain comprising a fountain medium which comprises water, said fountain further comprising as a solution or dispersion in said fountain medium at least one moiety which is an intrinsically conductive polymer, wherein a functional pattern of said intrinsically conductive polymer is provided on said receiving material when said fountain is transferred to said receiving medium, and wherein aqueous fountain medium further contains an aprotic organic compound with a dielectric constant $\geq 15$.

55. The process according to claim 54, wherein said intrinsically conductive polymer is selected from the group consisting of polyanilines, polyaniline derivatives, polypyrroles, polypyrrole derivatives, polythiophenes and polythiophene derivatives.

56. The process according to claim 54, wherein said process further comprises heating said receiving medium within 10 minutes after printing to a temperature of $\leq 150°$ C.

57. The process according to claim 54, wherein said intrinsically conductive polymer is a polymer or copolymer of a 3,4-dialkoxythiophene in which the two alkoxy groups may be the same or different or together represent an optionally substituted oxy-alkylene-oxy bridge.

58. The process according to claim 54, wherein said intrinsically conductive polymer is selected from the group consisting of: homopolymers of (3,4-methylenedioxythiophene), (3,4-methylenedioxythiophene) derivatives, (3,4-ethylenedioxy-thiophene), (3,4-ethylenedioxythiophene) derivatives, (3,4-propylenedioxythiophene), (3,4-(propylenedioxythiophene) derivatives, (3,4-butylenedioxythiophene) and (3,4-butylenedioxythiophene) derivatives and copolymers thereof.

59. The process according to claim 54, wherein said aqueous fountain medium further comprises a polyanion.

60. The process according to claim 59, wherein said polyanion is poly(styrenesulfonate).

61. The process according to claim 54, wherein said aqueous fountain medium further contains a di- or polyhydroxy- and/or carboxy groups or amide or lactam group containing organic compound.

62. The process according to claim 61, wherein said di- or polyhydroxy- and/or carboxy groups or amide or lactam group containing organic compound is selected from the group consisting of 1,2-propandiol, propylene glycol, diethylene glycol, N-methyl pyrrolidinone and di(ethylene glycol)ethyl ether acetate.

63. The process according to claim 61, wherein said process further comprises heating said receiving medium within 10 minutes after printing to a temperature of 100 to 250° C.

64. The process according to claim 54, wherein said fountain further comprises a non-ionic or anionic surfactant.

65. The process according to claim 54, wherein said fountain has a viscosity at 25° C. after stirring to constant viscosity of 30 mPa.s as measured according to DIN 53211.

66. A process for the offset printing of a receiving medium with a functional pattern comprising in any order the steps of:
applying a printing ink to a printing plate and wetting said printing plate with a fountain comprising a fountain medium comprising between 50% by weight and 100% by weight of water and at least one moiety having at least polymeric intrinsically conductive properties thereby providing said printing plate with an area inked with said printing ink and an area coated with said fountain, and transferring said printing ink and fountain onto said receiving medium, wherein a functional pattern of said at least one moiety is provided on said receiving medium, wherein said moiety having at least polymeric intrinsically conductive properties is an intrinsically conductive polymer, and wherein said intrinsically conductive polymer is a polymer or copolymer of a 3,4-dialkoxythiophene in which the two alkoxy groups may be the same or different or together represent an optionally substituted oxy-alkylene-oxy bridge.

67. The process according to claim 66, wherein said intrinsically conductive polymer is selected from the group consisting of: homopolymers of (3,4-methylenedioxythiophene), (3,4-methylenedioxythiophene) derivatives, (3,4-ethylenedioxythiophene), (3,4-ethylenedioxythiophene) derivatives, (3,4-propylenedioxythiophene), (3,4-(propylenedioxythiophene) derivatives, (3,4-butylenedioxythiophene) and (3,4-butylenedioxythiophene) derivatives and copolymers thereof.

68. The process according to claim 66, wherein said aqueous fountain medium further comprises a polyanion.

69. The process according to claim 68, wherein said polyanion is poly(styrenesulfonate).

70. The process according to claim 66, wherein said aqueous fountain medium further comprises a di- or polyhydroxy- and/or carboxy groups or amide or lactam group containing organic compound.

71. The process according to claim 70, wherein said di- or polyhydroxy- and/or carboxy groups or amide or lactam group containing organic compound is selected from the group consisting of 1,2-propandiol, propylene glycol, diethylene glycol, N-methyl pyrrolidinone and di(ethylene glycol)ethyl ether acetate.

72. The process according to claim 70, wherein said process further comprises heating said receiving medium within 10 minutes after printing to a temperature of 100° C. to 250° C.

73. The process according to claim 66, wherein said fountain further comprises a non-ionic or anionic surfactant.

74. The process according to claim 66, wherein said fountain has a viscosity at 25° C. after stirring to constant viscosity of 30 mPa.s as measured according to DIN 53211.

75. A process, for the offset printing of a receiving medium with a functional pattern comprising in any order the steps of:
applying a printing ink to a printing plate and wetting said printing plate with a fountain comprising a fountain medium comprising between 50% by weight and 100% by weight of water and at least one moiety having at least polymeric intrinsically conductive properties thereby providing said printing plate with an area inked with said printing ink and an area coated with said fountain, and transferring said printing ink and fountain onto said receiving medium, wherein a functional pattern of said at least one moiety is provided on said receiving medium, and wherein said aqueous fountain medium further contains an aprotic organic compound with a dielectric constant $\geq 15$.

76. The process according to claim 75, wherein the fountain comprises at least one moiety having at least polymeric intrinsically conductive properties as a solution or dispersion in said fountain medium.

77. The process according to claim 75, wherein said moiety having at least having at least polymeric intrinsically conductive properties is an intrinsically conductive polymer.

78. The process according to claim 77, wherein said intrinsically conductive polymer is selected from the group consisting of polyanilines, polyaniline derivatives, polypyrroles, polypyrrole derivatives, polythiophenes and polythiophene derivatives.

79. The process according to claim 77, wherein said intrinsically conductive polymer is a polymer or copolymer of a 3,4-dialkoxythiophene in which the two alkoxy groups may be the same or different or together represent an optionally substituted oxy-alkylene-oxy bridge.

80. The process according to claim 77, wherein said intrinsically conductive polymer is selected from the group consisting of: homopolymers of (3,4-methylenedioxythiophene), (3,4-methylenedioxythiophene) derivatives, (3,4-ethylenedioxy-thiophene), (3,4-ethylenedioxythiophene) derivatives, (3,4-propylenedioxythiophene), (3,4-(propylenedioxythiophene) derivatives, (3,4-butylenedioxythiophene) and (3,4-butylenedioxythiophene) derivatives and copolymers thereof.

81. The process according to claim 66, wherein said process further comprises heating said receiving medium within 10 minutes after printing to a temperature of $\geq 150°$ C.

82. The process according to claim 75, wherein said aqueous fountain medium further comprises a polyanion.

83. The process according to claim 82, wherein said polyanion is poly(styrenesulfonate).

84. The process according to claim 75, wherein said aqueous fountain medium further contains a di- or polyhydroxy- and/or carboxy groups or amide or lactam group containing organic compound.

85. The process according to claim 84, wherein said di- or polyhydroxy- and/or carboxy groups or amide or lactam group containing organic compound is selected from the group consisting of 1,2-propandiol, propylene glycol, diethylene glycol, N-methyl pyrrolidinone and di(ethylene glycol)ethyl ether acetate.

86. The process according to claim 84, wherein said process further comprises heating said receiving medium within 10 minutes after printing to a temperature of 100° C. to 250° C.

87. The process according to claim 75, wherein said fountain further comprises a non-ionic or anionic surfactant.

88. The process according to claim 75, wherein said fountain has a viscosity at 25° C. after stirring to constant viscosity of 30 mPa.s as measured according to DIN 53211.

* * * * *